US008289228B2

(12) United States Patent  
Arai

(10) Patent No.: US 8,289,228 B2
(45) Date of Patent: Oct. 16, 2012

(54) DISPLAY DEVICE, METHOD OF DRIVING DISPLAY DEVICE, AND ELECTRONIC APPARATUS

(75) Inventor: Yoshio Arai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 863 days.

(21) Appl. No.: 12/098,806

(22) Filed: Apr. 7, 2008

(65) Prior Publication Data

US 2008/0258997 A1 Oct. 23, 2008

(30) Foreign Application Priority Data

Apr. 18, 2007 (JP) ................................ 2007-108973
Apr. 18, 2007 (JP) ................................ 2007-108974

(51) Int. Cl.
*G09G 5/00* (2006.01)
(52) U.S. Cl. .................. 345/6; 345/4; 348/59; 359/619
(58) Field of Classification Search ............. 345/6, 178, 345/102, 87, 90–93, 4; 348/E13.029, 54, 348/59
See application file for complete search history.

(56) References Cited

U.S. PATENT DOCUMENTS

| 5,457,574 A * | 10/1995 | Eichenlaub ................. 359/619 |
| 5,771,066 A | 6/1998 | Barnea |
| 5,943,166 A * | 8/1999 | Hoshi et al. .................. 359/475 |
| 6,703,989 B1 * | 3/2004 | Harrold et al. ................. 345/32 |
| 7,133,015 B1 * | 11/2006 | Yoshida et al. ................ 345/99 |
| 7,369,725 B2 | 5/2008 | Takatori et al. |
| 7,477,220 B2 | 1/2009 | Muto |
| 7,609,445 B2 | 10/2009 | Hamagishi |
| 7,656,472 B2 | 2/2010 | Takatori et al. |
| 7,705,810 B2 * | 4/2010 | Choi et al. ..................... 345/77 |
| 2002/0024618 A1 | 2/2002 | Imai |
| 2002/0113866 A1 * | 8/2002 | Taniguchi et al. ............. 348/51 |
| 2003/0048237 A1 * | 3/2003 | Sato et al. ..................... 345/32 |
| 2004/0119676 A1 * | 6/2004 | Nam et al. ..................... 345/87 |
| 2004/0263451 A1 * | 12/2004 | Muto ............................ 345/87 |
| 2005/0285828 A1 * | 12/2005 | Inoue et al. ................... 345/76 |
| 2006/0150121 A1 * | 7/2006 | Kim ............................. 715/827 |
| 2006/0152523 A1 * | 7/2006 | Tomita ......................... 345/589 |
| 2006/0187181 A1 * | 8/2006 | Kim ............................. 345/102 |
| 2007/0153515 A1 * | 7/2007 | Hong et al. ................... 362/237 |
| 2009/0040426 A1 * | 2/2009 | Mather et al. ................. 349/65 |

FOREIGN PATENT DOCUMENTS

| JP | A-08-248381 | 9/1996 |
| JP | A-10-161061 | 6/1998 |
| JP | A-2002-169515 | 6/2002 |
| JP | A-2002-223453 | 8/2002 |
| JP | A-2002-296588 | 10/2002 |
| JP | A-2003-259395 | 9/2003 |
| JP | A-2005-017491 | 1/2005 |
| JP | A-2005-077473 | 3/2005 |
| JP | A-2005-530196 | 10/2005 |
| JP | A-2006-259191 | 9/2006 |
| JP | A-2007-080735 | 3/2007 |
| WO | WO 03/107083 A1 | 12/2003 |

* cited by examiner

*Primary Examiner* — Alexander Eisen
*Assistant Examiner* — Sanjiv D Patel
(74) *Attorney, Agent, or Firm* — Oliff & Berridge, PLC

(57) ABSTRACT

A display device includes a display body in which a plurality of unit display areas that display images having a parallax therebetween so as to be viewed stereoscopically is arranged and a drive circuit that sequentially displays single-color images of a plurality of color components which constitute a first image and a second image having a parallax therebetween for each one or more of unit display areas among the plurality of unit display areas.

7 Claims, 11 Drawing Sheets

DISPLAY DEVICE, METHOD OF DRIVING DISPLAY DEVICE, AND ELECTRONIC APPARATUS

BACKGROUND

1. Technical Field

The present invention relates to technology for displaying an image using a field sequential method.

2. Related Art

When one (hereinafter, referred to as a left eye image) between images of two types having parallax therebetween is visually recognized in the left eye and the other (hereinafter, referred to as a right eye image) is visually recognized in the right eye, an observer can recognize a stereoscopic view. There have been proposed various methods of allowing the left eye image and the right eye image to be individually perceived in the observer's left and right eyes. For example, in JP-A-2003-259395, a configuration in which a parallax barrier is disposed on the front side of the display device has been disclosed.

However, under the configuration using the parallax barrier, all the pixels of the display device are divided into pixels for displaying the left eye image and pixels for displaying the right eye image, and accordingly, there is a problem that the substantial resolution of an image perceived by the observer decreases.

SUMMARY

An advantage of some aspects of the invention is that a plurality of images (a right eye image and a left eye image) for stereoscopic viewing can be displayed at high resolution.

According to a first aspect of the invention, there is provided a display device including: a display body in which a plurality of unit display areas that display images having a parallax therebetween so as to be viewed stereoscopically is arranged; and a drive circuit that sequentially displays single-color images of a plurality of color components which constitute a first image and a second image having a parallax therebetween for each one or more of unit display areas among the plurality of unit display areas.

Under the above-described configuration, since single-color images of the first image and single-color images of the second image are sequentially displayed in a time-division manner, it is possible to increase the resolution of an image perceived by an observer, compared to a case where a parallax barrier is disposed on the front side of the liquid crystal device. In addition, since the single-color images of the first and second images are sequentially displayed for one or more of the unit display areas, there is an advantage that color breakup occurring in a case where the viewing position of the observer is moved over each unit display area is suppressed.

In a first embodiment of the display device according to the first aspect of the invention, the drive circuit sequentially displays the single-color images of the plurality of color components which constitute the first image within a first period and displays the single-color images of the plurality of color components which constitute the second image within a second period that is different from the first period. In addition, in a second embodiment of the display device according to the first aspect, the drive circuit alternately displays the single-color images of the plurality of color components which constitute the first image and the single-color images of the plurality of color components which constitute the second image within the unit period. According to the second embodiment, the single-color images of the first image and the single-color images of the second image are displayed alternately, and thus, there is an advantage that the observer can rarely perceive flicker, compared to a case where the display device according to the above-described first embodiment is used.

In the display device according to the first aspect, the display body may include: an illumination device that emits single-color light of each of the plurality of color components selectively in a first direction or a second direction that is different from the first direction for each of the plurality of unit display areas; and a display body that controls transmittance for light emitted from the illumination device for each pixel, and the drive circuit may include: an illumination driving circuit that emits single-color light corresponding to each color component from the illumination device in the first direction for each of the plurality of unit display areas in a period in which the single-color images of the color components of the first image are displayed, and emits single-color light corresponding to each color component from the illumination device in the second direction for each of the plurality of unit display areas in a period in which the single-color images of the color components of the second image are displayed; and a display driving circuit that controls transmittance of each pixel of the display body in correspondence with gray scales of the single-color images of the plurality of color components which constitute the first image and the second image. In such a case, each single-color light for displaying the first image and each single-color light for displaying the second image are output in different directions, and thereby a stereoscopic view can be made with the naked eye.

Another embodiment of the display device according to the first aspect further includes an image processing circuit that generates a separation image signal for designating gray scales of the plurality of color components including at least one between a white component and mixed color components of two types based on an input image signal that designates gray scales of the plurality of primary color components for each pixel for the first image and the second image. In addition, in the display device, the drive circuit sequentially displays the single-color images of the plurality of color components which constitute the first image and the second image based on the separation image signal for each one or more of the display areas. According to the above-described embodiment, the single-color images of color components (mixed color components or a white component) other than the primary color components are displayed, and thereby it is possible to suppress the color breakup, compared to a case where a configuration in which only single-color images of the primary color components are displayed is used.

According to a second aspect of the invention, there is provided a method of driving the display device according to the first aspect. The method of driving a display device in which a plurality of unit display areas that display images having a parallax therebetween so as to be viewed stereoscopically is arranged includes sequentially displaying single-color images of a plurality of color components which constitute a first image and a second image having a parallax therebetween for each one or more of unit display areas among the plurality of unit display areas. According to the above-described method, a same advantage as that of the display device according to the first aspect can be acquired.

According to a third aspect of the invention, there is provided a display device including: a display body that display images having parallax therebetween so as to be viewed stereoscopically; and a drive circuit that sequentially displays single-color images of a plurality of color components which constitute a first image and a second image having parallax therebetween in the display body within each unit period, and changes the order of the color components displayed in the display body in a first unit period and a second unit period that is different from the first unit period. Under the above-described configuration, since single-color images of the first image and single-color images of the second image are sequentially displayed in a time-division manner, it is possible to increase the resolution of an image perceived by an observer, compared to a case where a parallax barrier is disposed in the front side of the liquid crystal device.

According to the above-described third aspect, single-color images of the first image and single-color images of the second image are sequentially displayed in a time-division manner, and therefore it is possible to increase the resolution of an image perceived by an observer, compared to a case where a parallax barrier is disposed on the front side of the liquid crystal device. In addition, since the orders of display colors of the single-color images are different from each other in the first unit period and the second unit period, there is an additional advantage that the color breakup perceived by the observer can be decreased.

In a first embodiment of the display device according to the third aspect, the drive circuit sequentially displays the single-color images of the plurality of color components which constitute the first image in a first period that is continuous within the unit period and sequentially displays the single-color images of the plurality of color components which constitute the second image in a second period that is continuous within the unit period. In addition, in a second embodiment according to the third aspect, the drive circuit alternately displays the single-color images of the plurality of color components which constitute the first image and the single-color images of the plurality of color components which constitute the second image within the unit period. According to the second embodiment, the single-color images of the first image and the single-color images of the second image are displayed alternately, and thus, there is an advantage that the observer can rarely perceive flicker, compared to a case where the display device according to the above-described first embodiment is used.

The display device according to the third aspect may include: an illumination device that emits each single-color light of the plurality of color components selectively in a first direction or a second direction that is different from the first direction; and a display body that controls transmittance for the light emitted from the illumination device for each pixel. In addition, in the display device, the drive circuit outputs single-color light corresponding to each color component in the first direction from the illumination device and controls transmittance of each pixel of the display body in correspondence with gray scales of single-color images in a period for displaying the single-color images of each color component of the first image, and outputs single-color light corresponding to each color component in the second direction from the illumination device and controls transmittance of each pixel of the display body in correspondence with gray scales of the single-color images in a period for displaying the single-color images of each color component of the second image. In such a case, each single-color light for displaying the first image and each single-color light for displaying the second image are output in different directions, and thereby a stereoscopic view can be made with the naked eye.

An embodiment of the display device according to the third aspect further includes an image processing circuit that generates a separation image signal for designating gray scales of the plurality of color components including at least one between a white component and mixed color components of two types based on an input image signal that designates gray scales of the plurality of primary color components for each pixel for the first image and the second image, and the drive circuit displays the single-color images of the plurality of color components which constitute the first image and the second image in the display body based on the separation image signal. According to the above-described embodiment, the single-color images of color components (mixed color components or a white component) other than the primary color components are displayed, and thereby it is possible to suppress the color breakup, compared to a case where a configuration in which only single-color images of the primary color components are displayed is used.

According to a fourth aspect of the invention, there is provided a method of driving the display device according to the third aspect. The method of driving a display body that display images having parallax therebetween so as to be viewed stereoscopically includes sequentially displaying single-color images of a plurality of color components which constitute a first image and a second image having parallax therebetween in the display body within each unit period and changing the order of the color components displayed in the display body in a first unit period and a second unit period that is different from the first unit period. According to the above-described method, a same advantage as that of the display device according to the third aspect can be acquired.

The pixel in the above-described aspects, for example, is implemented by an electro-optical device of which an optical characteristic such as transmittance or luminance is changed by an electrical function (for example, application of an electric field or supply of a current). As a typical example of the electro-optical device, there is a liquid crystal element formed by sealing a liquid crystal between electrodes. In addition, the display device according to the above-described aspects is used in various electronic apparatuses.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
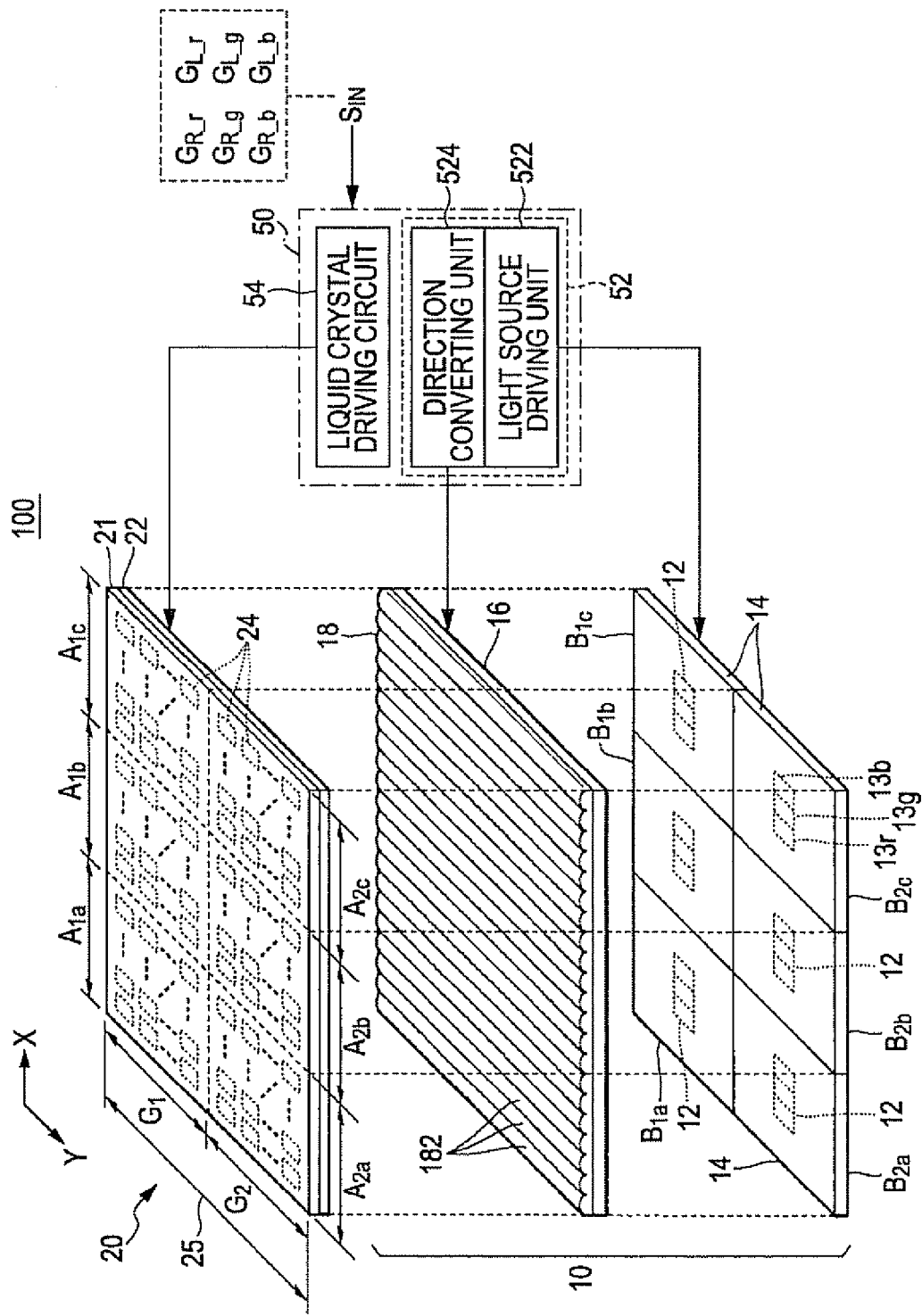
FIG. 1 is a block diagram of a display device according to Embodiment A1 of the invention.

Hereinafter a plurality of embodiments of the present invention will be described with reference to the accompanying drawings. In descriptions below, elements to which a same reference numeral is attached have a common function and a common operation, unless otherwise mentioned.

Embodiment A1

FIG. 1 is a block diagram showing the configuration of a display device according to Embodiment A1 of the invention. As shown in FIG. 1, the display device 100 includes an illumination device 10, a liquid crystal device 20, and a drive circuit 50. The illumination device 10 is disposed on the rear side of the liquid crystal device 20 and illuminates the display device 100. In FIG. 1, although the illumination device 10 and the liquid crystal device 20 are illustrated to be apart from each other for the convenience of description, actually the illumination device 10 and the liquid crystal device 20 are disposed to be close to each other.

The liquid crystal device 20 has a first substrate 21 and a second substrate 22 which face each other. In a gap between the first substrate 21 and the second substrate 22, a liquid crystal (not shown) is sealed. A liquid crystal of an OCB (Optically Compensated Bend) mode or the like that responds at high speed can be appropriately used. On a surface of the second substrate 22 which faces the liquid crystal, a plurality of pixel electrodes 24 corresponding to pixels of an image is disposed in the shape of a matrix in directions X and Y which interest with each other. The alignment of the liquid crystal pinched by the first substrate 21 and the second substrate 22 changes in accordance with a difference between electric potentials of the pixel electrode 24 and an opposing electrode (not shown) disposed on the surface of the first substrate 21. Accordingly, the ratio (transmittance) of the amount of light transmitted to the observation side to light emitted from the illumination device 10 is controlled for each pixel 24. Inside the liquid crystal device 20, a coloring layer (color filter) is not formed.

As shown in FIG. 1, a rectangular display area (an area in which the pixel electrodes 24 are arranged) 25, in which an image is displayed, of the liquid crystal device 20 is divided into two areas G (G1 and G2) which are adjacent in direction Y. The area G1 is divided into three unit display areas A1 (A1a, A1b, and A1c) that are arranged in direction X. Likewise, the area G2 is divided into three unit display areas A2 (A2a, A2b, and A2c) that are arranged in direction X. In other words, in the display area 25, six unit display areas A (A1a, A1b, A1c, A2a, A2b, and A2c) are arranged in directions X and Y. Each unit display area A is a rectangular area having a same size. In each unit display area A, a plurality of the pixel electrodes 24 are arranged in the shape of a matrix in directions X and Y.

The illumination device 10 is constituted by six illumination units B (B1a, B1b, B1c B2a, B2b, and B2c) corresponding to the unit display areas A, a liquid crystal shutter 16, and an optical body 18. In FIG. 1, although the illumination units B, the liquid crystal shutter 16, and the optical body 18 are illustrated to be apart from one another for the convenience of description, they are actually disposed to be close to one another.

As shown in FIG. 1, the illumination units B and the unit display areas A corresponding to the illumination units B are overlapped with each other, when viewed in a direction perpendicular to the display area 25 (X-Y plane). For example, the illumination unit B1a is overlapped with the unit display area A1a, and the illumination unit B1b is overlapped with the unit display area A1b. Consequently, the six illumination units B are arranged in the shape of a matrix in directions x and Y, as shown in FIG. 1.

Figure 2:
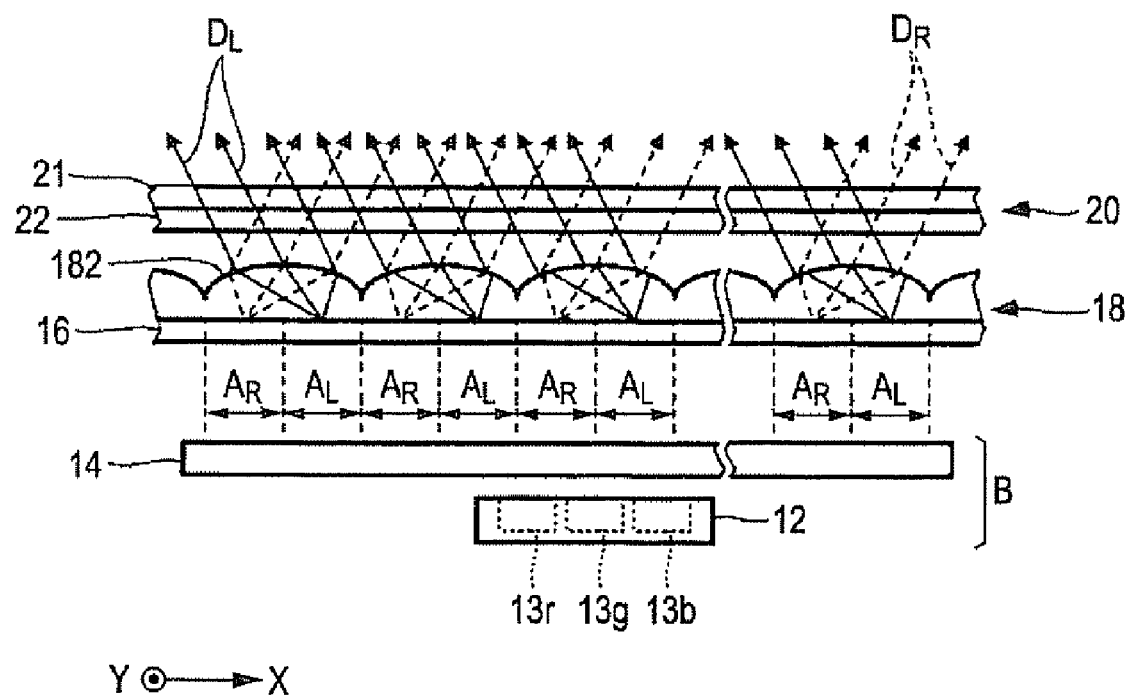
FIG. 2 is a side view of the display device according to Embodiment A1.

FIG. 2 is an enlarged side view of one illumination unit B of the illumination device 10. As shown in FIGS. 1 and 2, each illumination unit B includes a light source 12 and a light guiding body 14. The light guiding body 14 is a rectangular board that faces the second substrate 22 of the liquid crystal device 20. The light source 12 is disposed to face the rear side of the light guiding body 14 and illuminates the rear side. As shown in FIGS. 1 and 2, the light source 12 include three light emitting bodies 13 (13$r$, 13$g$, and 13$b$) emitting single-color light corresponding to primary color components of three types. The light emitting body 13$r$ emits single-color light (red light) having a wavelength corresponding to a red color. Similarly, the light emitting body 13$g$ emits green light, and the light emitting body 13$b$ emits blue light. The light guiding body 14 outputs light incident from the light source 12 from the whole surface on the liquid crystal device 20 side. Although a reflection plate, a scatter plate, and the like are bonded to the light guiding body 14, they are omitted in FIG. 1 for the convenience of description.

The liquid crystal shutter 16 is interposed in a gap between the liquid crystal device 20 and the illumination units B (light guiding bodies 14). The liquid crystal shutter 16 is constituted by sealing a liquid crystal between substrates facing each other, and individually controls the transmittance of the liquid crystal in the plurality of areas AR and the plurality of areas AL. As shown in FIG. 2, the areas AR and the areas AL extend in direction Y and are arranged alternately along direction X. The light output from the light guiding bodies 14 is output to the liquid crystal device 20 side by passing through the areas AR or the areas AL.

The optical body 18 is interposed in a gap between the liquid crystal device 20 and the liquid crystal shutter 16. As shown in FIGS. 1 and 2, the optical body 18 is a light-transmitting member formed by arranging a plurality of lenticular lenses 182, which extend in direction Y, in direction X. When viewed in a direction perpendicular to the display area 25, one lenticular lens 182 is overlapped with the area AR and the area AL of the liquid crystal shutter 16 which are adjacent to each other in direction X. As shown in FIG. 2, each lenticular lens 182 allows light output from the area AR to travel in direction DR and allows light output from the area AL to travel in direction DL. The light output in direction DR passes through the liquid crystal device 20 and reaches the right eye of an observer. In addition, the light output in direction DL passes through the liquid crystal device 20 and reaches the left eye of the observer.

As shown in FIG. 1, to the drive circuit 50, an input image signal SIN is supplied from an external device (not shown). The input image signal SIN designates display colors of pixels for a right eye image and a left eye image which have parallax therebetween. The input image signal SIN according to this embodiment individually designates gray scales for three-type primary color components (a red color, a green color, and a blue color) constituting display colors of the pixels. In other words, the input image signal SIN designates a gray scale GR_r of a red component (hereinafter, referred to as an "R component"), a gray scale GR_g of a green component (hereinafter, referred to as a "G component"), and a gray scale GR_b of a blue component (hereinafter, referred to as a "B component") for each pixel for the right eye image and designates a gray scale GL_r of the R component a gray scale GL_g of the G component, and a gray scale GL_b of the B component for each pixel for the left eye image.

The drive circuit 50 is a circuit that drives the illumination device 10 and the liquid crystal device 20 based on the input image signal SIN. The drive circuit 50 includes an illumination driving circuit 52 that drives the illumination device 10 and a liquid crystal driving circuit 54 that drives the liquid crystal device 20. The drive circuit 50 may be embodied in an arbitrary form. For example, a configuration in which the illumination driving circuit 52 is built in the illumination device 10 and the liquid crystal driving circuit 54 is built in the liquid crystal device 20 or a configuration in which the illumination driving circuit 52 and the liquid crystal driving circuit 54 are implemented in a signal integrated circuit may be used.

Figure 3:
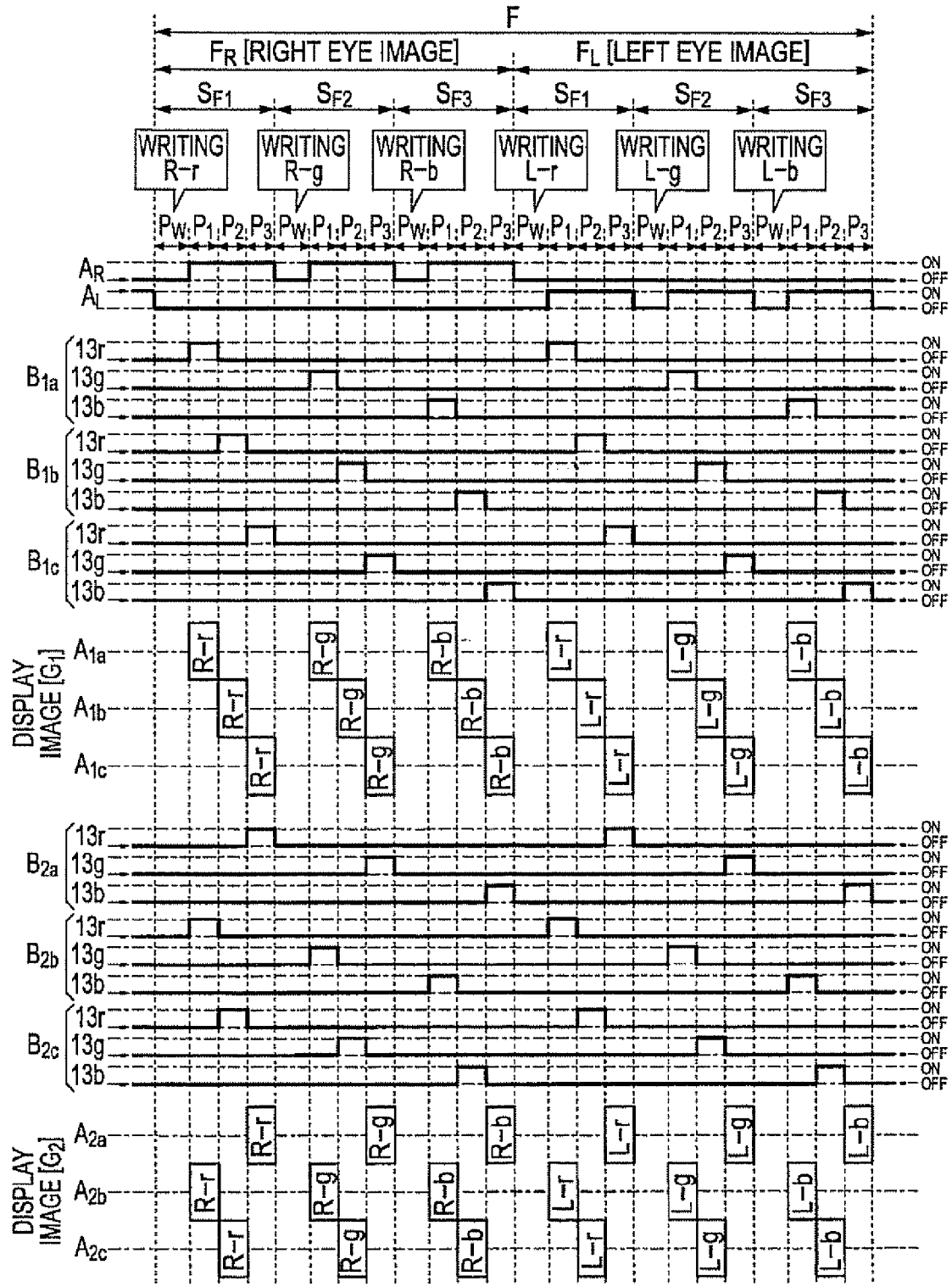
FIG. 3 is a timing chart showing the operation of the display device according to Embodiment A1.

FIG. 3 is a timing chart showing the operation of the display device 100. In FIG. 3, a symbol R represents a right eye image, and a symbol L represents a left eye image. In addition, a symbol r represents an R component, a symbol g represents a G component, and a symbol b represents a B component. Accordingly, for example, a symbol "R-r" shown in FIG. 3 represents a single-color image of the R component of the right eye image.

A unit period F shown in FIG. 3 is a period (frame) used for displaying one image that is viewed stereoscopically to an observer. As shown in FIG. 3, one unit period F is divided into a period FR for displaying a right eye image and a period FL for displaying a left eye image. Each one between the periods FR and FL is constituted by three sub fields SF (SF1 to SF3) corresponding to different primary color components. Each sub field SF includes a write period PW and three display periods P1 to P3. The drive circuit 50 drives the illumination device 10 and the liquid crystal device 20 such that single-color images of the primary color components constituting the right eye image are sequentially displayed in each unit display area A in the sub fields SF1 to SF3 of the period FR and single-color images of the primary color components constituting the left eye image are sequentially displayed in each unit display area A in the subfields SF1 to SF3 of the period FL. A detailed description thereof will be followed.

The liquid crystal driving circuit 54 sets the electric potential (hereinafter, referred to as data electric potentials) corresponding to the gray scale designated by the input image signal SIN for the primary color component to be the electric potential of each pixel electrode 24 of the liquid crystal device 20 in a write period PW of a sub field SF in which a single-color image of each primary color component of the left eye image or the right eye image is to be displayed. Described in more details, the liquid crystal driving circuit 54 supplies a data electric potential corresponding to the gray scale GR_r that is designated to be the R component of each pixel of the right eye image by the input image signal SIN to each pixel electrode 24 in a write period PW of a sub field SF1 corresponding to the R component of the period FR (writing R-r). Similarly, the liquid crystal driving circuit 54 supplies a data electric potential corresponding to the gray scale GR_g to each pixel electrode 24 in a write period PW of a sub field SF2 corresponding to the G component of the period FR (writing R-g), and the liquid crystal driving circuit 54 supplies a data electric potential corresponding to the gray scale GR_b to each pixel electrode 24 in a write period PW of a sub field SF3 corresponding to the B component of the period FR (writing R-b). In each write period PW of the sub fields SF1 to SF3 of the period FL, data electric potentials corresponding to the gray scales (GL_r, GL_g, and GL_b) of each pixel of the left eye image are supplied to each pixel electrode 24 in the same order. In correspondence with the data electric potential set in the pixel 24 in the write period PW, the transmittance of the liquid crystal of the liquid crystal device 20 in the display periods P1 to P3 right after the write period is set.

As shown in FIG. 1, the illumination driving circuit 52 includes a light source driving unit 522 that controls light sources 12 and a direction converting unit 524 that controls the liquid crystal shutter 16. The light source driving unit 522 selectively turns on a plurality of light emitting bodies 13 (13r, 13g, and 13b) for each illumination unit B. Described in more details, in the subfield SF, in which a single-color image of each primary color component is to be displayed, of each of the periods FR and FL, the light source driving unit 522 sequentially turns on the light emitting bodies 13 (three light emitting bodies 13 of a same color) of the primary color component of three illumination units B1a, B1b, and B1c disposed within the area G1 in the display periods P1 to P3 and sequentially turns on the light emitting bodies 13 of the primary color component of three illumination units B2a, B2b, and B2c disposed within the area G2 in the display periods P1 to P3. An illumination unit B1 of which light emitting bodies 13 are turned on in the area G1 in one display period P and an illumination unit B2 of which light emitting bodies 13 are turned on in the area G2 in the display period P are not adjacent to each other in direction Y.

For example, when three illumination units B1 (B1a, B1b, and B1c) within the area G1 are considered, as shown in FIG. 3, the light emitting body 13r of the illumination unit B1a emits light in the display period 21 in the sub field SF1 of the period FR, the light emitting body 13r of the illumination unit B1b emits light in the display period P2, and the light emitting body 13r of the illumination unit B1c emits light in the display period P3 (B1a→B1b→B1c). On the other hand, for three illumination units B2 (B2a, B2b, and B2c) within the area G2, the light emitting body 13r emits light in the display period P1 in the sub field SF1 of the period FR, the light emitting body 13r of the illumination unit B2c emits light in the display period P2, and the light emitting body 13r of the illumination unit B2a emits light in the display period P3 (B2b→B2c→B2a). In the subfield SF2, a same operation as that described above is performed for the green light emitting bodies of each illumination unit B, and a same operation as that described above is performed for the blue light emitting bodies 13b in the subfield SF3. In addition, in the period FL, the light emitting bodies 13 of each illumination unit B emit light in the same order.

The direction converting unit 524 shown in FIG. 1 is means that allows light emitted from the illumination device 10 to travel in one direction between directions DR and DL by individually controlling the transmittance of the liquid crystal shutter 16 for the areas AR and the areas AL. Described in more details, the direction converting unit 524, as shown in FIG. 3, in the sub periods SF1 to SF3 within the FR period in which the single-color images of the right eye image are to be displayed, increases (ON) the transmittance of each area AR and decreases (OFF) the transmittance of each area AL. In addition, in the display periods P1 to P3 of the sub fields SF1 to SF3 within the period FL in which single-color images of the left eye image are to be displayed, the direction converting unit 524 increases the transmittance of each area AL and decreases the transmittance of each area AR.

Since, the drive circuit 50 operates as described above, in the display periods P1 to P3 of each of the sub fields SF1 to SF3 of the period FR, single-color images of each primary color component of the right eye image are sequentially output in direction DR for each of two unit display areas A which are not adjacent to each other in directions X and Y. For example, as shown in FIG. 3, in the sub field SF1 of the period FR, single-color images of an R component of the right eye image are displayed in the unit display areas A1a and A2b in the display period P1, displayed in the unit display areas A1b and A2c in the display period P2, and displayed in the unit display areas A1c and A2a in the display period P3. Similarly, in the subfield SF2 of the period FR, single-color images of a G component of the right eye image are sequentially displayed in the unit display areas A. In addition, in the subfield SF3, single-color images of a B component of the right eye image are sequentially displayed in the unit display areas A. Consequently, in the period FR, the single-color images of three types of the primary color components of the right eye image are displayed in one unit display area A. In addition, in the display periods P1 to P3 of the sub fields SF1 to SF3 of the period FL, single-color images of the original primary color components of the left eye image, similarly in the period FR, are sequentially output to each of two unit display areas A that are not adjacent to each other in directions X and Y in direction DL.

The observer sequentially recognizes the single-color images of the right eye image which are output in direction DR in the subfields SF1 to SF3 within the period FR visually in the right eye for perceiving the colored right eye image. In addition, the observer sequentially recognizes the single-color images of the left eye image which are output in direction DL in the subfields SF1 to SF3 within the period FL visually in the left eye for perceiving the colored left eye image. Consequently, the observer perceives a color image having a stereoscopic effect for each unit period F.

As described above, according to this embodiment, since the right eye image and the left eye image are displayed in a time-division mode using the whole pixels of the liquid crystal device 20, it is possible to increase the resolution of an image perceived by the observer, compared to a case where a configuration (a configuration in which the right eye image and the left eye image are simultaneously displayed in the liquid crystal device 20) in which a parallax barrier is installed to the front side of the liquid crystal device 20 is used. In addition, since a color image is displayed using a field sequential method, the liquid crystal device 20 is not required to display primary color components of three types simultaneously (in other words, pixels are not required to be divided into three). Accordingly, the advantage that an image with high resolution is displayed is very remarkable.

In addition, since the single-color images of the right eye image and the left eye image are sequentially displayed in the unit display areas A within the sub fields SF, color breakup due to movement of viewing position of the observer can be effectively suppressed. For example, when the observer's viewing position moves to the left side within a display period P in which a single-color image is displayed in the unit display area A1b, display of the single-color image in the destination unit display area A1a is already completed, and accordingly the color breakup due to the movement of the viewing position is not perceived by the observer. Similarly, when the observer's viewing position moves to the lower side within a display period P in which a single-color image is displayed in the unit display area A1b, display of the single-color image in the destination unit display area A2b is already completed, and accordingly the color breakup due to the movement of the viewing position is not perceived by the observer.

Embodiment A2

Next, Embodiment A2 of the invention will be described. In Embodiment A1, a configuration in which single-color images of the right eye image are sequentially displayed in a continuous period FR within the unit period F and single-color images of the left eye image are sequentially displayed in a continuous period FL within the unit period F is used as an example. On the contrary, according to this embodiment, single-color images of the right eye image and single-color images of the left eye image are alternately displayed in the sub fields SF within the unit period F.

Figure 4:
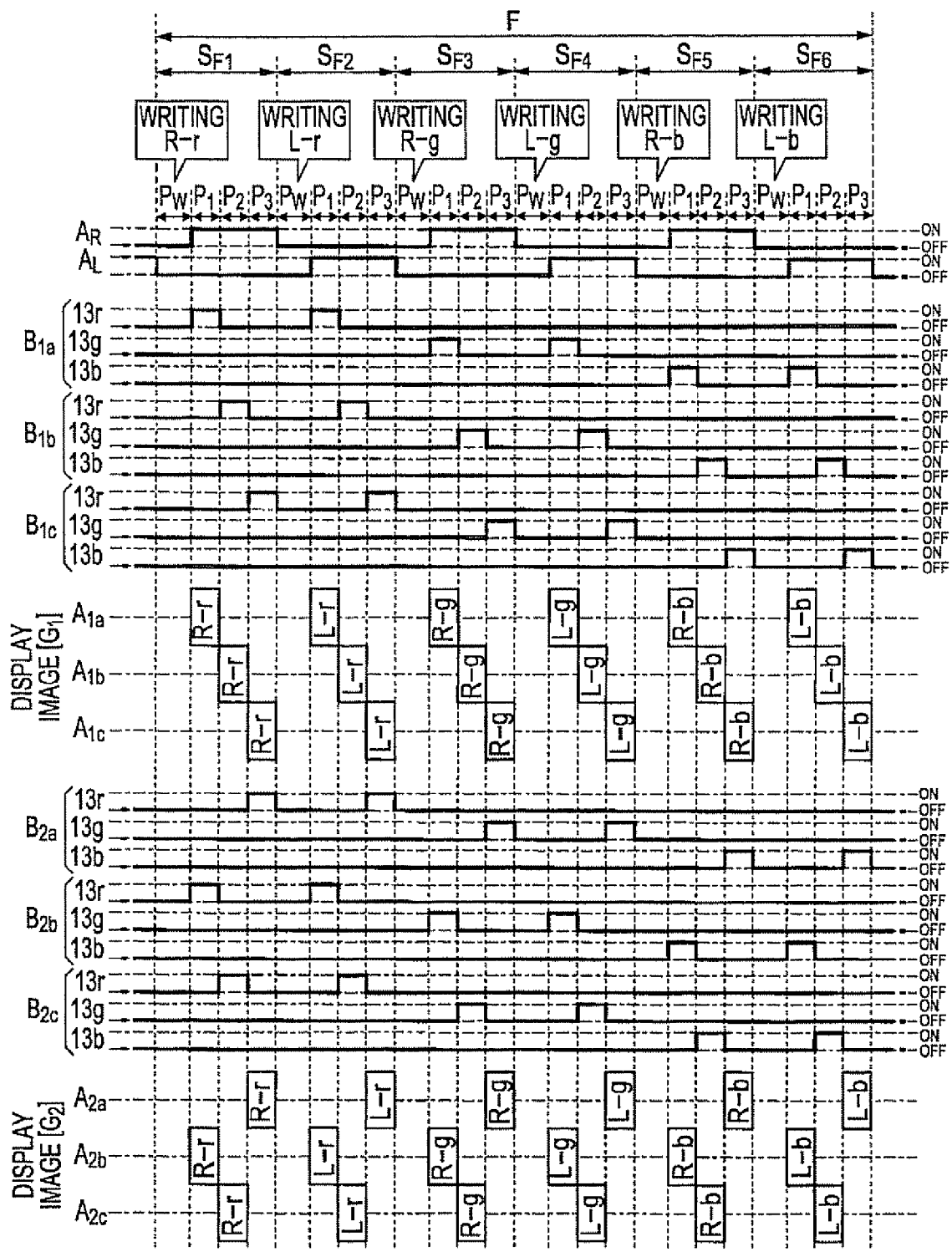
FIG. 4 is a timing chart showing the operation of a display device according to Embodiment A2 of the invention.

FIG. 4 is a timing chart showing the operation of the display device 100. As shown in FIG. 4, each unit period F is divided into six sub fields SF1 to SF6. In the display periods P1 to P3 of odd display sub fields SF (SF1, SF3, and SF5), single-color images of the primary color components of the right eye image are sequentially displayed in each unit display area A. In addition, in the display periods P1 to P3 of even display sub fields SF (SF2, SF4, and SF6), single-color images of the primary color components of the left eye image are sequentially displayed in each unit display area A. A detailed description thereof will be followed.

The liquid crystal driving circuit 54 supplies data electric potentials corresponding to gray scales (GR_r, GR_g, and GR_b) of the primary color components of the right eye image to the pixel electrodes 24 in the write period PW of the odd sub fields SF. In addition, the liquid crystal driving circuit 54 supplies data electric potentials corresponding to gray scales (GL_r, GL_g, and GL_b) of the primary color components of the left eye image to the pixel electrodes 24 in the write period PW of the even sub fields SF.

The light source driving unit 522, in the display periods P1 to P3 of the subfields SF1 and SF2 corresponding to the R component, sequentially turns on the light emitting bodies 13r of each illumination unit B within the area G1 and the light emitting bodies 13r of each illumination unit B within the area G2. Similarly, the light source driving unit 522, in the display periods P1 to P3 of the subfields SF3 and SF4 corresponding to the G component, sequentially turns on the light emitting bodies 13g within the area G1 and the light emitting bodies 13g within the area G2. In addition, the light source driving unit 522, in the display periods P1 to P3 of the subfields SF5 and SF6 corresponding to the B component, sequentially turns on the light emitting bodies 13b within the area G1 and the light emitting bodies 13b within the area G2. Similarly to Embodiment A1, the illumination unit B1 in which the light emitting bodies 13 emit light in the area G1 and the illumination unit B2 in which the light emitting bodies 13 emit light in area G2 are not adjacent to each other in direction Y.

The direction converting unit 524, in the display periods P1 to P3 of the odd sub fields SF, increases the transmittance of each area AR and decreases the transmittance of each area AL. In addition, the direction converting unit 524, in the display periods P1 to P3 of the even sub fields SF, increases the transmittance of each area AL and decreases the transmittance of each area AR.

The drive circuit 50 operates as described above, and thus, single-color images (R-r, R-g, and R-b) of the primary color components of the right eye image are sequentially output in each two unit display areas A in direction DR in the display periods P1 to P3 of the odd sub fields SF, and single-color images (L-r, L-g, and L-b) of the primary color components of the left eye image are sequentially output in each two unit display areas A in direction DL in the display periods P1 to P3 of the even sub fields SF. Therefore, according to this embodiment, a same advantage as that according to Embodiment A1 can be acquired.

Under a configuration in which single-color images of the right eye image and the left eye image are displayed by using a time-division method, as in the above-described embodiments, light emitted from the liquid crystal device 20 reaches the observer's right and left eyes intermittently. In other words, when the single-color images of the right eye image are displayed, images do not reach the observer's the left eye, and when the single-color images of the left eye image are displayed, images do not reach the observer's right eye. Under a configuration in which single-color images of the right eye image and single-color images of the left eye image are alternately displayed in each sub field SF, as in this embodiment, a period in which light emitted from the liquid crystal device 20 reaches the observer's one eye can be shortened, compared to Embodiment A1 in which a plurality of single-color images of the right eye image are consecutively displayed in the period FR and a plurality of single-color images of the left eye image are consecutively displayed in the period FL. Therefore, according to this embodiment, there is an advantage that periodical changes of the liquid crystal device 20 in brightness (flicker) can be rarely perceived by the observer.

Embodiment A3

Next, Embodiment A3 of the invention will be described. In Embodiments A1 and A2, a configuration in which single-color images of the primary color components of three types are displayed for each of the right eye image and the left eye image is used as an example. According to this embodiment, single-color images of a plurality of color components extracted from a display color designated by the input image signal SIN are displayed for the right eye image and the left eye image.

Figure 5:
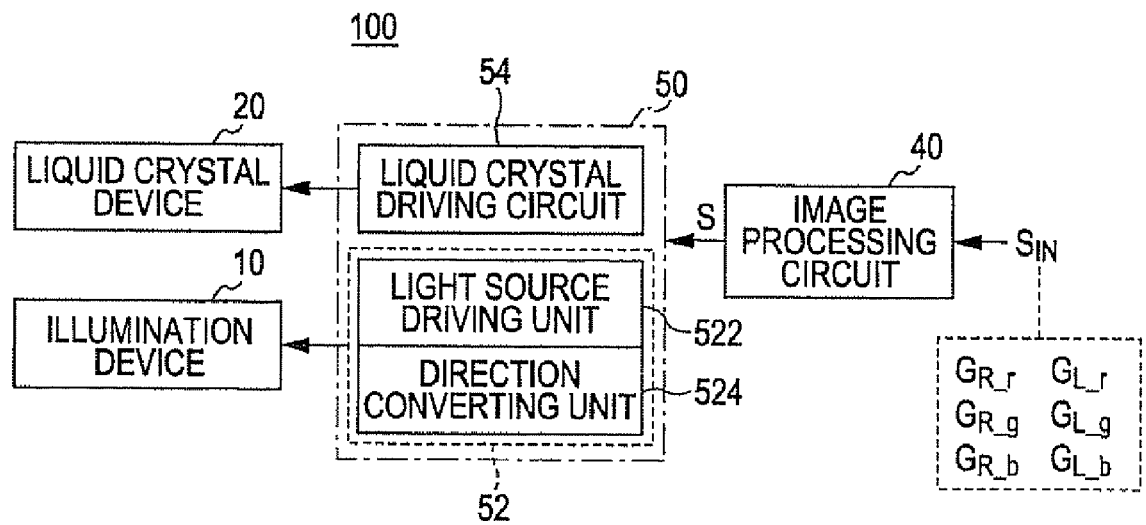
FIG. 5 is a block diagram of a display device according to Embodiment A3 of the invention.

FIG. 5 is a block diagram showing the configuration of the display device 100. As shown in FIG. 5, the display device 100 according to this embodiment further includes an image processing circuit 40 in addition to the elements of Embodiment A1. The image processing circuit 40 generates a separation image signal S based on the input image signal SIN and outputs the separation image signal S. The separation image signal S is a signal for designating gray scales of each component for pixels of the right eye image and the left eye image in a case where a display color designated by the input image signal SIN is divided into a plurality of color components. The separation image signal S according to this embodiment designates a cyan (C) component, a yellow (Y) component, a magenta (M) component, and a white (W) component for the right eye image and the left eye image, in addition to the same primary color components of three types as those in Embodiment A1, for the right eye image and the left eye image.

Figures 6A, 6B:
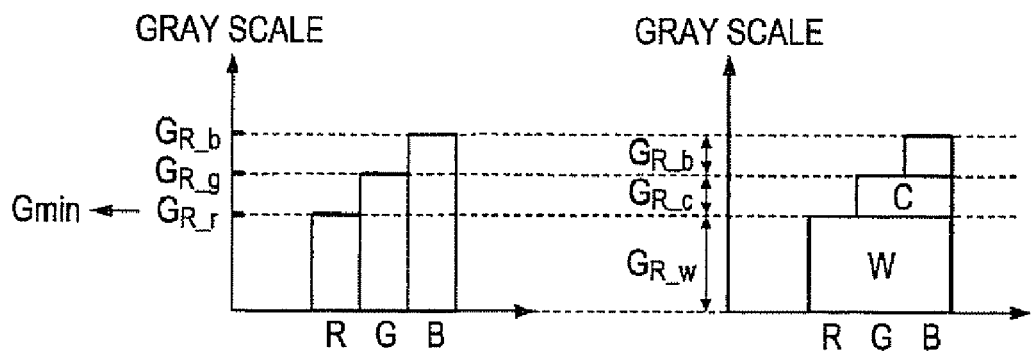
FIGS. 6A and 6B are schematic diagrams showing the operation for generating a separation image signal according to Embodiment A3.

In FIG. 6A, a detailed example of gray scales GR_r, GR_g, and GR_b of the primary color components which are designated for one pixel of the right eye image by the input image signal SIN is shown. The image processing circuit 40 sets a minimum value Gmin of the primary color components (GR_r, GR_g, and GR_b) of three types which are designated for one pixel by the input image signal SIN as the gray scale GR_w of the white component. Then, the image processing circuit 40, as shown in FIG. 6B, divides the G component and the B component which remain after the extraction of the white component into a mixed color component (C component) thereof and the B component, and designates gray scales (GR_c and GR_b) in the separation image signal S. When an R component and a G component remain after the white component is extracted, the gray scale of the Y component is designated by the separation image signal S. On the other hand, when the B component and the R component remain, the gray scale of the M component is designated in the separation image signal S. In FIGS. 6A and 6B, although an example for the right eye image is illustrated, for the left eye image, a similar operation is performed.

The drive circuit 50 controls the illumination device 10 and the liquid crystal device 20 based on the separation image signal S. In other words, the drive circuit 50 controls the illumination device 10 and the liquid crystal device 20 such that the single-color images of seven types (a white component, primary color components of three types, and mixed color components of three types) of color components of the right eye image are sequentially output in direction DR for each unit area A in seven sub fields SF1 to SF7 which are resulted from dividing the period FR of the unit period F and single-color images of color components of seven types of the left eye image are sequentially output in direction DL for each unit display area A in seven sub fields SF1 to SF7 of the period FL.

According to this embodiment, a same advantage as that according to Embodiment A1 is acquired. In addition, according to this embodiment, single-color images of the white component and the mixed components are sequentially displayed in addition to the primary color components, and accordingly, it is possible to suppress color breakup, compared to a case where Embodiment A1 in which only single-color images of the primary color components are displayed is used. The configuration according to this embodiment in which single-color images of mixed color components and a white component extracted from the input image signal SIN are displayed may be employed in Embodiment A2. For example, a configuration in which single-color images of a plurality of color components (a white component, primary color components of three types, and mixed color components of three types) constituting the right eye image and single-color images of a plurality of color components constituting the left eye image are alternately displayed for each sub field SF is employed.

Embodiment B1

Figure 7:
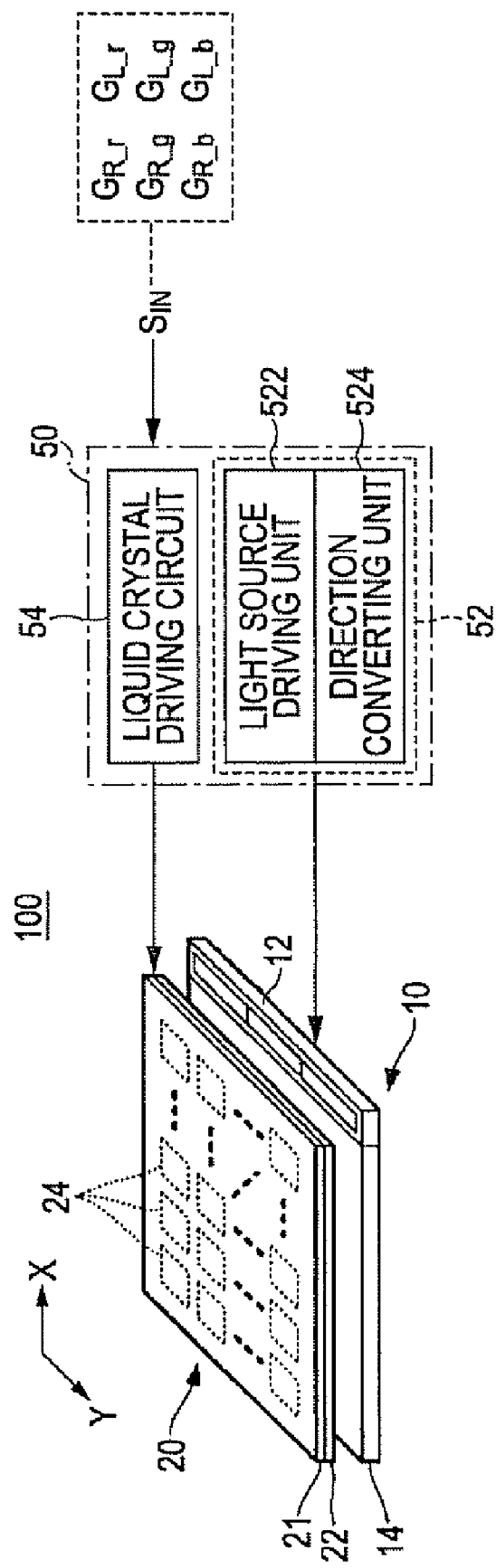
FIG. 7 is a block diagram of a display device according to Embodiment B1 of the invention.

Next, FIG. 7 is a block diagram showing a display device according to Embodiment B1 of the invention. As shown in FIG. 7, the display device 100 includes an illumination device 10, a liquid crystal device 20, and a drive circuit 50. The illumination device 10 is disposed on the rear side of the liquid crystal device 20 and illuminates the display device 100.

The liquid crystal device 20 has a first substrate 21 and a second substrate 22 which face each other. In a gap between the first substrate 21 and the second substrate 22, a liquid crystal (not shown) is sealed. A liquid crystal of an OCB (Optically Compensated Bend) mode or the like that responds at high speed is appropriately used on a surface of the second substrate 22 which faces the liquid crystal, a plurality of pixel electrodes 24 corresponding to each pixel of an image is disposed in the shape of a matrix in directions X and Y which interest with each other. The alignment of the liquid crystal pinched by the first substrate 21 and the second substrate 22 changes in accordance with a difference between electric potentials of the pixel electrode 24 and an opposing electrode (not shown) disposed on the surface of the first substrate 21. Accordingly, the ratio (transmittance) of the amount of light transmitted to the observation side to the light emitted from the illumination device 10 is controlled for each pixel 24. Inside the liquid crystal device 20, a coloring layer (color filter) is not formed.

Figure 8:
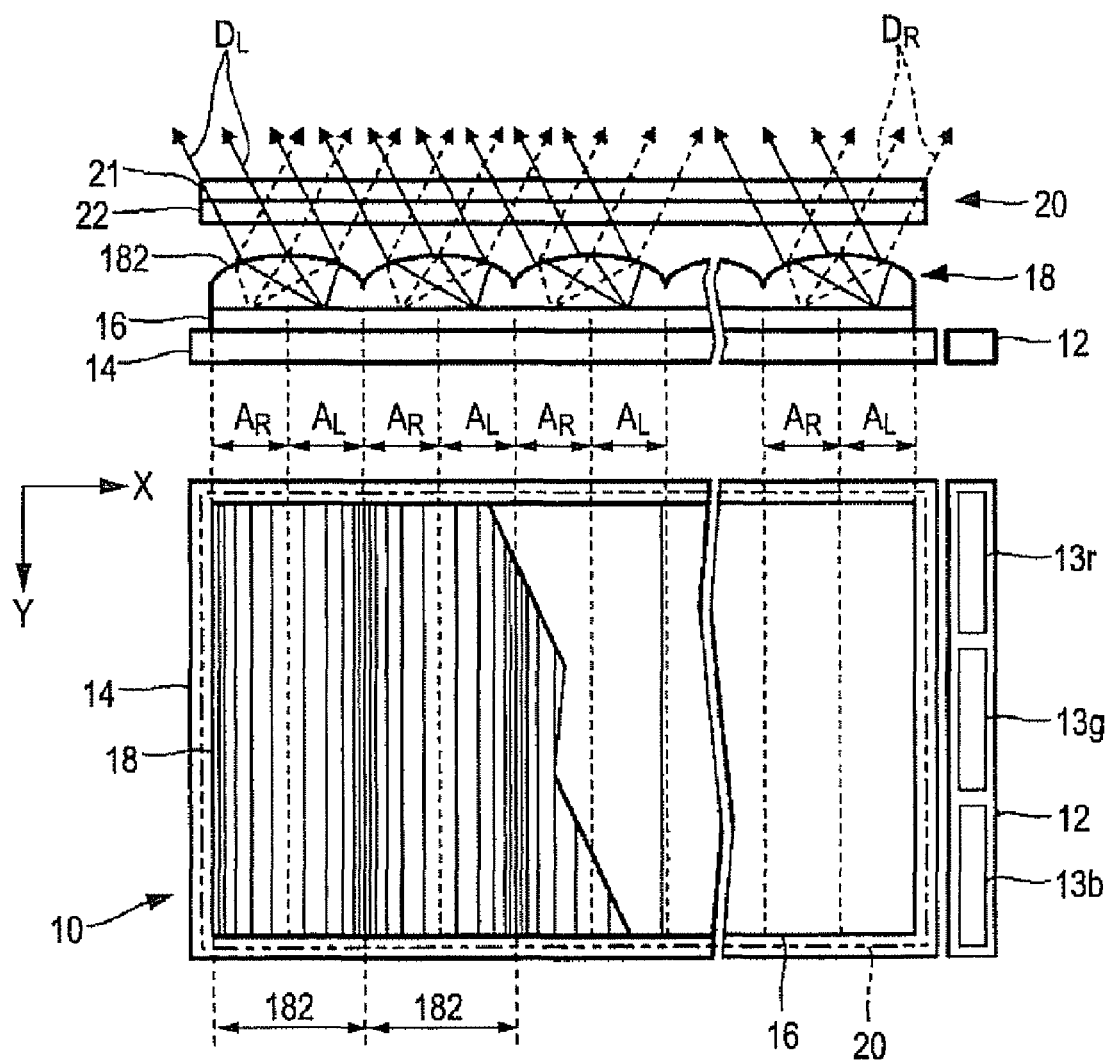
FIG. 8 is plan and side views of a display device according to Embodiment B1.

FIG. 8 is a plan view and a side view that show the configuration of the illumination device 10. As shown in FIG. 8, the illumination device 10 is constituted by a light source 12, a light guiding body 14, a liquid crystal shutter 16, and an optical body 18. In FIG. 7, the liquid crystal shutter 16 and the optical body 18 are not shown.

The light guiding body 14 is a rectangular board that faces the second substrate 22 of the liquid crystal device 20. The light source 12 is disposed to face the side surface of the light guiding body 14 and illuminates the side surface. The light source 12 includes a plurality of light emitting bodies 13 (13r, 13g, and 13b) that emit single-color light corresponding to different colors. The light emitting body 13r emits single-color light (red light) having a wavelength corresponding to a red color. Similarly, the light emitting body 13g emits green light, and the light emitting body 13b emits blue light. The light guiding body 14 outputs light incident from the light source 12 from the whole surface on the liquid crystal device 20 side.

The liquid crystal shutter 16 shown in FIG. 8 is interposed in a gap (for example, a side of the light guiding body 14 which faces the liquid crystal device 20) between the liquid crystal device 20 and the light guiding body 14. The liquid crystal shutter 16 is constituted by sealing a liquid crystal between substrates facing each other, and individually controls the transmittance of the liquid crystal in the plurality of areas AR and the plurality of areas AL. The areas AR and the areas AL extend in direction Y and are arranged alternately along direction X. The light output from the light guiding body 14 is output to the liquid crystal device 20 side by passing through the areas AR or the areas AL.

The optical body 18 is interposed in a gap between the liquid crystal device 20 and the liquid crystal shutter 16. As shown in FIG. 8, the optical body 18 is a light-transmitting member formed by arranging a plurality of lenticular lens 182, which extend in direction Y, in direction X. When viewed from a direction perpendicular to the light emitting surface (X-Y plane), one lenticular lens 182 is overlapped with the area AR and the area AL of the liquid crystal shutter 16 which are adjacent to each other in direction X. As shown in FIG. 8, each lenticular lens 182 allows light output from the area AR to travel in direction DR and light output from the area AL to travel in direction DL. The light output in direction DR passes through the liquid crystal device 20 and reaches the observer's right eye. The light output in direction DL passes through the liquid crystal device 20 and reaches the observer's left eye.

As shown in FIG. 7, to the drive circuit 50, an input image signal SIN is supplied from an external device (not shown). The input image signal SIN designates a display color of each pixel for a right eye image and a left eye image which have parallax therebetween. The input image signal SIN individually designates gray scales for three-type primary color components (a red color, a green color, and a blue color) constituting the display color of a pixel. In other words, the input image signal SIN designates a gray scale GR_r of an R component, a gray scale GR_g of a G component, and a gray scale GR_b of a B component for each pixel for the right eye image and designates a gray scale GL_r of a R component, a gray scale GL_g of a G component, and a gray scale GL_b of a B component for each pixel for the left eye image.

The drive circuit 50 shown in FIG. 7 is a circuit that drives the illumination device 10 and the liquid crystal device 20 based on the input image signal SIN. The drive circuit 50 includes an illumination driving circuit 52 that drives the illumination device 10 and a liquid crystal driving circuit 54 that drives the liquid crystal device 20. The drive circuit 50 may be embodied in an arbitrary form. For example, a configuration in which the illumination driving circuit 52 is built in the illumination device 10 and the liquid crystal driving circuit 54 is built in the liquid crystal device 20 or a configuration in which the illumination driving circuit 52 and the liquid crystal driving circuit 54 are implemented in a signal integrated circuit may be used.

Figure 9:
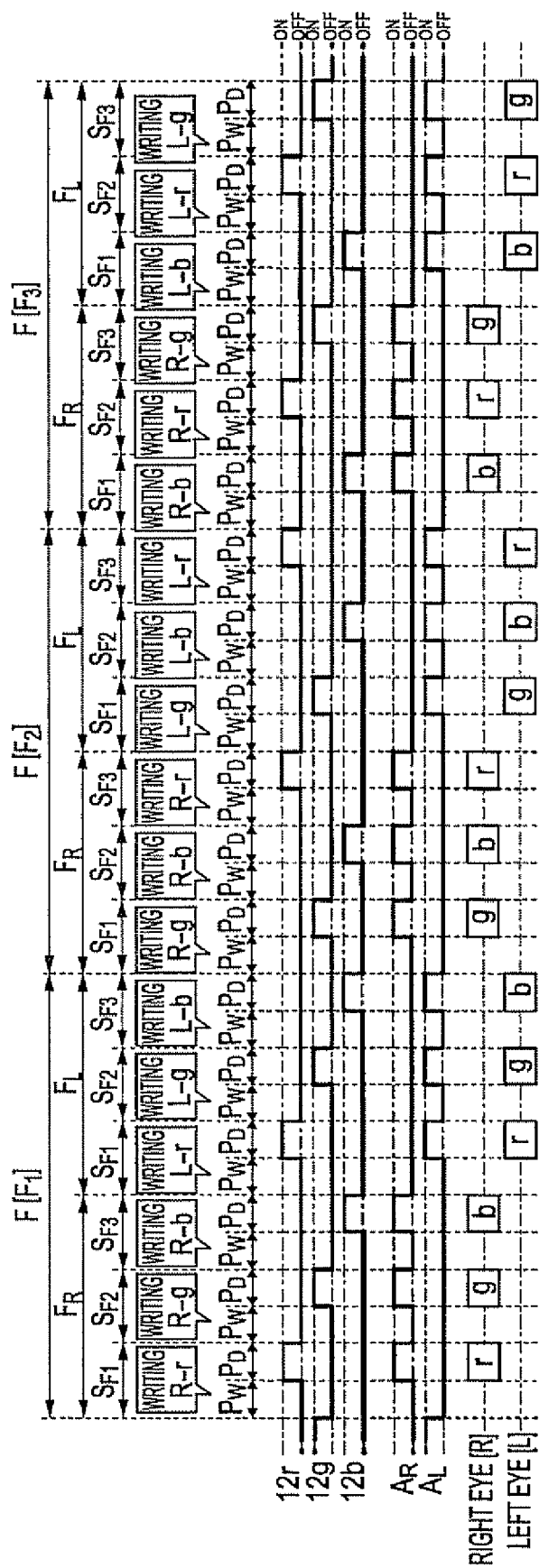
FIG. 9 is a timing chart showing the operation of the display device according to Embodiment B1.

FIG. 9 is a timing chart showing the operation of the display device 100. In FIG. 9, a symbol R represents a right eye image, and a symbol L represents a left eye image. In addition, a symbol r represents an R component, a symbol g represents a G component, and a symbol b represents a B component, Accordingly, for example, a symbol "R-r" shown in FIG. 9 represents a single-color image of an R component of the right eye image.

Each unit period F (F1, F2, F3, . . . ) in FIG. 9 is a period (frame) used for displaying one image that is viewed stereoscopically to an observer. As shown in FIG. 9, one unit period F is divided into a period FR for displaying a right eye image and a period FL for displaying a left eye image. Each one of the periods FR and FL is constituted by three sub fields SF (SF1 to SF3) corresponding to different primary color components. Each sub field SF includes a write period PW and a display period PD. The drive circuit 50 drives the illumination device 10 and the liquid crystal device 20 such that single-color images of the primary color components constituting the right eye image are sequentially displayed in the subfields SF1 to SF3 of the period FR and single-color images of the primary color components constituting the left eye image are sequentially displayed in the subfields SF1 to SF3 of the period FL.

The liquid crystal driving circuit 54 sets the electric potential corresponding to the gray scale designated by the input image signal SIN for the primary color component to be the electric potential of each pixel electrode 24 of the liquid crystal device 20 in a write period PW of a sub field SF in which a single-color image of each primary color component of the left eye image or the right eye image is to be displayed. For example, the liquid crystal driving circuit 54, as shown in FIG. 9, supplies a data electric potential corresponding to the gray scale GR_r of the R component of the right eye image to each pixel electrode 24 in a write period PW of a sub field SF (for example, and supplies a sub field SF1 of the period FR within the unit period F1) of the period FR in which a single-color image of the R component is to be displayed (writing R-r). In addition, the liquid crystal driving circuit 54 supplies a data electric potential corresponding to the gray scale GL_b of the B component of the left eye image to each pixel electrode 24 in a write period PW of a sub field SF (for example, a sub field SF3 of the period FL within the unit period F1) within the period FR in which a single-color image of the B component is to be displayed (writing L-b). In correspondence with the data electric potential set in the pixel 24 in the write period PW, the transmittance of the liquid crystal of the liquid crystal device 20 in the display period PD right after the write period is determined.

As shown in FIG. 7, the illumination driving circuit 52 includes a light source driving unit 522 that controls light sources 12 and a direction converting unit 524 that controls the liquid crystal shutter 16. The light source driving unit 522 selectively turns on a light emitting body 13 corresponding to the primary color component of the single-color image to be displayed in each sub field SF in the display period PD of the sub field SF. For example, as shown in FIG. 9, in the display period PD of the sub field SF in which a single-color image of the R component of the right eye image or the left eye image is to be displayed, the light source driving unit 522 turns on the light emitting body 13r and turns off the light emitting body 13g and the light emitting body 13b. Similarly, the light source driving unit 522 turns on only the light emitting body 13g in the display period PD of the sub field SF in which a single-color image of the G component is to be displayed, and turns on only the light emitting body 13b in the display period PD of the sub field SF in which a single-color image of the B component is to be displayed.

The direction converting unit 524 shown in FIG. 7 is means that allows light emitted from the illumination device 10 to travel in one between the direction DR and the direction DL by individually controlling the transmittance of the liquid crystal shutter 16 for the areas AR and the areas AL. Described in more details, the direction converting unit 524, as shown in FIG. 9, in the display period PD of each sub field SP (period FR) in which the single-color image of the right eye image is to be displayed, increases (ON) the transmittance of each area AR and decreases (OFF) the transmittance of each area AL. In addition, in the display period PD of each sub field SF (period FL) in which the single-color image of the left eye image is to be displayed, the direction converting unit 524 increases the transmittance of each area AL and decreases the transmittance of each area AR.

Since, the drive circuit 50 operates as described above, in the display period PD of the sub field SF in which the single-color image of each primary color component of the right eye image is to be displayed, single-color light of the primary color component is output from each area AR in direction DR and passes through the liquid crystal device 20. In addition, in the display period PD of the sub field SF in which the single-color image of each primary color component of the left eye image is to be displayed, single-color light of the primary color component is output from each area AL in direction DL and passes through the liquid crystal device 20. The observer sequentially recognizes the single-color images of the right eye image in the subfields SF1 to SF3 within the period FR visually in the right eye for perceiving the colored right eye image. In addition, the observer sequentially recognizes the single-color images of the left eye image in the subfields SF1 to SF3 within the period FL visually in the left eye for perceiving the colored left eye image. Consequently, the observer perceives a color image having a stereoscopic effect for each unit period F.

As shown in FIG. 9, the drive circuit 50 drives the illumination device 10 and the liquid crystal device 20 such that the orders of the primary color components of the single-color images displayed in each of the periods FR and FL are different in adjacent unit periods F. For example, as shown in FIG. 8, in the periods FR and FL of the unit period F1, single-color images of the right eye image and the left eye image are displayed in the order of the R component→the G component→the B component. On the other hand, the single-color images are displayed in the order of the G component→the B component→the R component in the unit period F2, and the single-color images are displayed in the order of the B component→the R component→the G component in the unit period F3. In unit periods F following the unit period F3, a same order as that in the unit periods F1 to F3 is repeated.

As described above, according to this embodiment, since the order (particularly, the leading display color in the period FR or FL) of display colors of the single-color images changes for each unit period F, the color breakup perceived by the observer can be reduced, compared to a case where a configuration in which the order of the display colors of the single-color images is fixed in all the unit periods F is used.

In addition, according to this embodiment, since the right eye image and the left eye image are displayed in a time-division mode using the whole pixels of the liquid crystal device 20, it is possible to increase the resolution of an image perceived by the observer, compared to a case where a configuration (a configuration in which the right eye image and the left eye image are simultaneously displayed in the liquid crystal device 20) in which a parallax barrier is installed on the front side of the liquid crystal device 20 is used. In addition, since a color image is displayed using a field sequential method, the liquid crystal device 20 is not required to display a plurality of primary color components simultaneously. Accordingly, the advantage that an image with high resolution is displayed is very remarkable.

Embodiment B2

Next, Embodiment B2 of the invention will be described. In Embodiment B1, a configuration in which single-color images of the right eye image are sequentially displayed in a continuous period FR within the unit period F and single-color images of the left eye image are sequentially displayed in a continuous period FL within the unit period F is used as an example. However, according to this embodiment, single-color images of the right eye image and the left eye image are alternately displayed in the sub fields SF within the unit period F.

Figure 10:
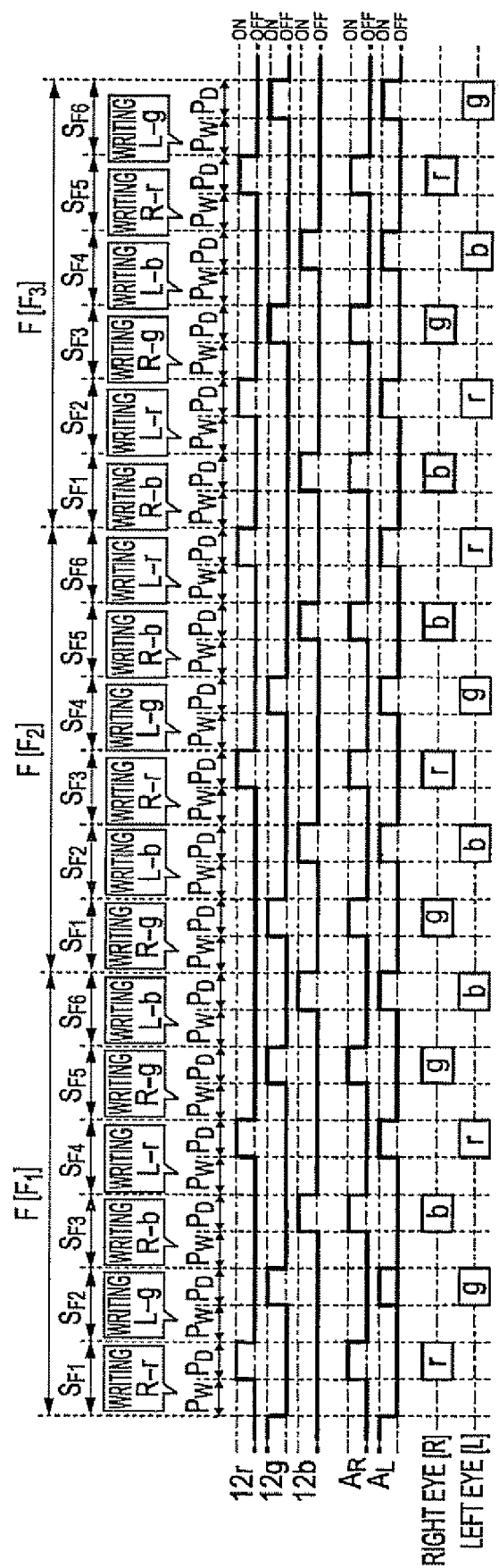
FIG. 10 is a timing chart showing the operation of a display device according to Embodiment B2 of the invention.

FIG. 10 is a timing chart showing the operation of the display device 100. As shown in FIG. 10, each unit period F is divided into six sub fields SF1 to SF6. In each display period PD of odd display sub fields SF (SF1, SF3, and SF5), single-color images of the primary color components of the right eye image are sequentially displayed. In addition, in each display period PD of even display sub fields SF (SF2, SF4, and SF6), single-color images of the primary color components of the left eye image are sequentially displayed. In each unit period F, single-color images of three-type primary color components are displayed for each one of the right eye image and the left eye image.

The drive circuit 50 controls the illumination device 10 and the liquid crystal device 20 such that the orders of the primary color components of the single-color images displayed in the sub fields SF1 to SF6 are different in adjacent unit periods F. In other words, as shown in FIG. 10, the single-color images of the right eye image and the left eye image are displayed in the order of the R component→the G component→B component→the R component→the G component→the B component in the unit period F1. In addition, the single-color images of the right eye image and the left eye image are displayed in the order of the G component→the B component→R component→the G component→the B component→the K component in the unit period F2, and are displayed in the order of the B component→the R component→the G component→the B component→the R component→the G component in the unit period F3. Therefore, according to this embodiment, a same advantage as that according to Embodiment B3 is acquired.

Under a configuration in which single-color images of the right eye image and the left eye image are displayed by using a time division method, as in the above-described embodiments, light emitted from the liquid crystal device 20 reaches the observer's right and left eyes intermittently. In other words, when the single-color images of the right eye image are displayed, an image does not reach the observer's left eye, and when the single-color images of the left eye image are displayed, an image does not reach the observer's right eye. Under a configuration in which single-color images of the right eye image and single-color images of the left eye image are alternately displayed in each sub field SF, as in this embodiment, a period in which light emitted from the liquid crystal device 20 reaches the observer's one eye is shortened, compared to Embodiment B1 in which a plurality of single-color images of the right eye image are consecutively displayed in the period FR and a plurality of single-color images of the left eye image are consecutively displayed in the period FL. Therefore, according to this embodiment, there is an advantage that periodical changes of the liquid crystal device 20 in brightness (flicker) can be rarely perceived by an observer.

Embodiment B3

Next, Embodiment B3 of the invention will be described in Embodiments B1 and B2, a configuration in which single-color images of the primary color components of three types are displayed for the right eye image and the left eye image is used as an example. According to this embodiment, single-color images of a plurality of color components extracted from a display color designated by the input image signal SIN are displayed for the right eye image and the left eye image.

Figure 11:
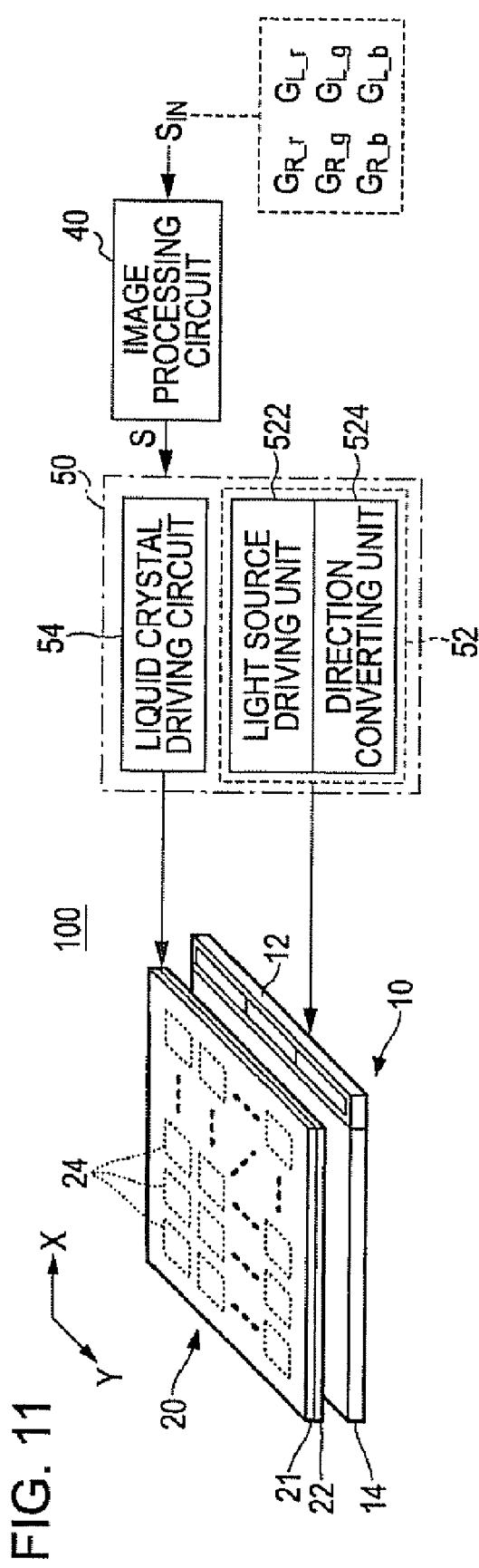
FIG. 11 is a block diagram of a display device according to Embodiment B3 of the invention.

FIG. 11 is a block diagram showing the configuration of the display device 100. As shown in FIG. 11, the display device 100 according to this embodiment further includes an image processing circuit 40 in addition to the elements of Embodiment B1. The image processing circuit 40 generates a separation image signal S based on the input image signal SIN and outputs the separation image signal S. The separation image signal S is a signal for designating gray scales of each color component for pixels of the right eye image and the left eye image in a case where a display color designated by the input image signal SIN is divided into a plurality of color components. The separation image signal S according to this embodiment designates a cyan (C) component, a yellow (Y) component, a magenta (M) component, and a white (W) component for the right eye image and the left eye image, in addition to the same primary color components of three types as those in Embodiment B1. The separation image signal S is generated by a process that has been described in Embodiment A3 with reference to FIGS. 6A and 6B.

Figure 12:
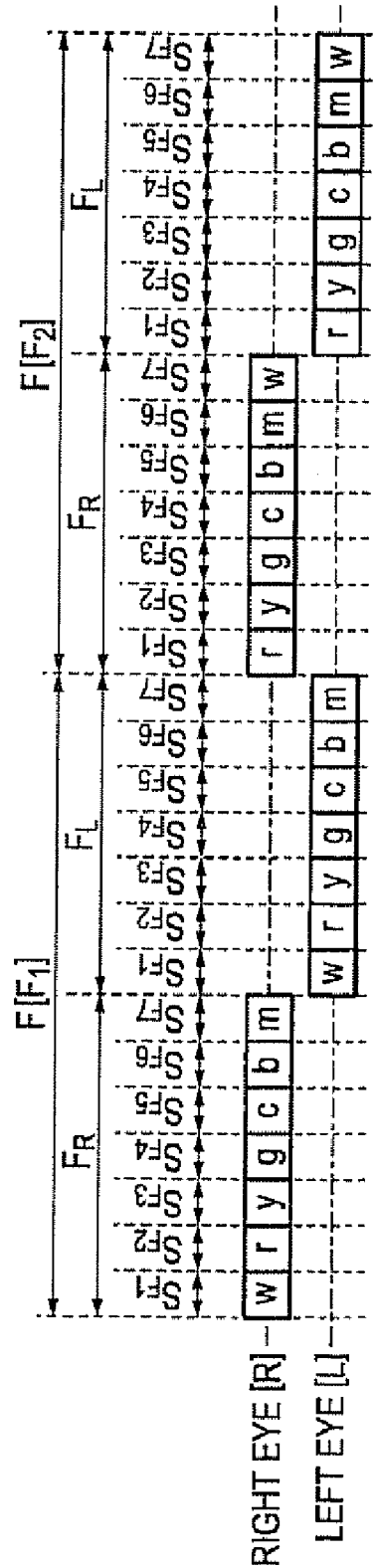
FIG. 12 is a timing chart showing the operation of a display device according to Embodiment B3.

FIG. 12 is a timing chart showing the order of display colors of single-color images for the right eye image and the left eye image. Each one of the periods FR and FL within the unit period F is divided into seven sub fields SP (SF1 to SF7). In FIG. 12, the write period PW is omitted.

As shown in FIG. 12, the drive circuit 50 controls the illumination device 10 and the liquid crystal device 20 based on the separation image signal S so as to sequentially display single-color images of a plurality of color components (a white component, primary color components of three types, and mixed color components of three types) constituting the right eye image in the sub fields SF1 to SF7 of the period FR. Similarly, in the sub fields SF1 to SF7 of the period FL, single-color images of a plurality of color components constituting the left eye image are sequentially displayed.

The drive circuit 50 changes the order of display colors of the single-color images for each unit period F. For example, in the unit period F1, single-color images of the right eye image and the left eye image are displayed in the order of the W component→the R component→the Y component→the G component→the C component→the B component→the M component. On the other hand, single-color images are displayed in the order of the R component→the Y component→the G component→the C component→the B component→the M component→the W component in the unit period F2. Therefore, according to this embodiment, a same advantage as that according to Embodiment B1 is acquired.

In addition, according to this embodiment, single-color images of the white component and the mixed components are sequentially displayed in addition to the primary color components, and accordingly, it is possible to suppress color breakup, compared to a case where the configuration of Embodiment B1 in which only single-color images of the primary color components are displayed is used. The configuration according to this embodiment in which single-color images of a mixed color component and a white component extracted from the input image signal SIN are displayed may be employed in Embodiment B2. For example, a configuration in which single-color images of a plurality of color components (a white component, primary color components of three types, and mixed color components of three types) constituting the right eye image and single-color images of a plurality of color components constituting the left eye image are alternately displayed for each sub field SF is employed.

MODIFIED EXAMPLES

Various modifications may be added to the above-described embodiments. Detailed modified examples are described below. Two or more examples arbitrary selected from among examples to be described below may be combined together.

Modified Example 1

In the above-described embodiments, a configuration in which light emitted from the light source 12 is allowed to travel in one between directions DR and DL has been described as an example. However, as a method of enabling an observer to individually perceive a right eye image and a left eye image in the right and left eyes, known technology may be arbitrarily used. For example, a method of allowing an observer to wear a glasses-type instrument in which the transmittance of a portion (hereinafter, referred to as a right eye portion) for covering the right eye and the transmittance of a portion (hereinafter, referred to as a left eye portion) for covering the left eye are individually controlled may be used. In other words, in a period in which the right eye image is displayed, the transmittance of the right eye portion is increased and the left eye portion is light-shielded. In addition, in a period in which the left eye image is displayed, the transmittance of the left eye portion is increased and the right eye portion is light-shielded. Under the above-described configuration, the liquid crystal shutter 16 and the optical body 18 are not needed, and accordingly, it is possible to simplify the configuration of the illumination device 10. As described above as an example, as the display device 100 according to an appropriate embodiment of the invention, any device capable of displaying images having parallax therebetween so as to be viewed stereoscopically may be used, and a detailed configuration thereof for implementing the stereoscopic view is not important in the embodiment of the invention.

Modified Example 2

In each of the above-described embodiments, a configuration in which light emitted from the illumination device 10 travels selectively in one direction between directions DR and DL is described as an example. However, a configuration in which the light emitted from the illumination device 10 is output in three or more directions may be used. In other words, the display devices 100 according to the above-described embodiments may be used for stereoscopically displaying images having a plurality of parallaxes.

Modified Example 3

In Embodiments A1 and A2, a configuration in which single-color images are displayed in two unit display areas A for each of the display periods P1 to P3. However, the number of the unit display areas A in which single-color images are displayed in parallel (simultaneously) may be arbitrarily configured. For example, a configuration in which a single-color image is displayed in each unit display area A or a configuration in which single-color images are displayed in three or more unit display areas may be used.

Modified Example 4

In Embodiments A1 and A2, the order of display colors of single-color images of the right eye image and the left eye image may be changed arbitrarily. For example, in Embodiment 2, the single-color images may be displayed in the order of the R component of the right eye image (R-r)→the G component of the left eye image (L-g)→the B component of the right eye image (R-b)→the R component of the left eye image (L-r)→the G component of the right eye image (R-g) →the B component of the left eye image (L-b) for each unit display area A. In addition, a configuration in which the order of the display colors of the single-color images is changed for each unit period F may be appropriately used.

Modified Example 5

In Embodiments A1 and A2, a configuration in which the liquid crystal shutter 16 and the optical body 18 continuously extend over all the illumination units B is used as an example. However, a configuration in which the liquid crystal shutter 16 or the optical body 18 is divided for each of one or a plurality of the illumination units B or is divided for each area G may be used. According to the configuration in which the liquid crystal shutter 16 or the optical body 18 continuously extend over a plurality of the illumination units B, there is an advantage that the number of components of the illumination device 10 decreases.

Modified Example 6

In Embodiments B1, B2, and B3, a configuration in which the order of display colors of the single-color images is changed for each unit period F. However, a configuration in which the order of display colors of the single-color images is changed for each of a plurality of unit periods F may be used. In other words, for the display device 100, the configuration in which the order of the display colors of the single-color images in one unit period F is different from that in another unit period F is appropriate, and the orders of the display colors are not needed to be different for all the adjacent unit periods F.

APPLICATION EXAMPLES

Figure 13:
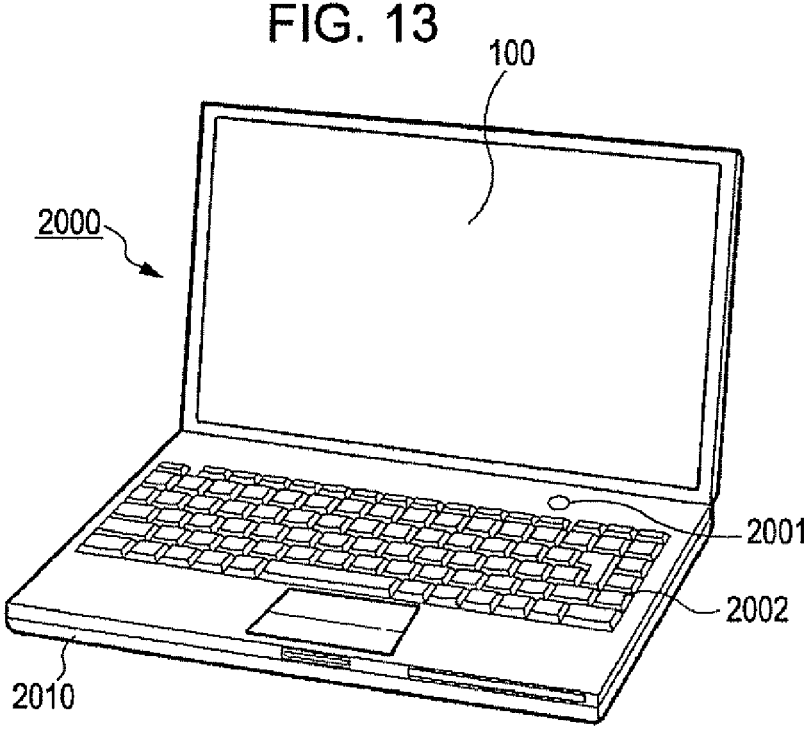
FIG. 13 is a perspective view showing a form of an electronic apparatus (personal computer) according to an embodiment of the invention.
Figure 14:
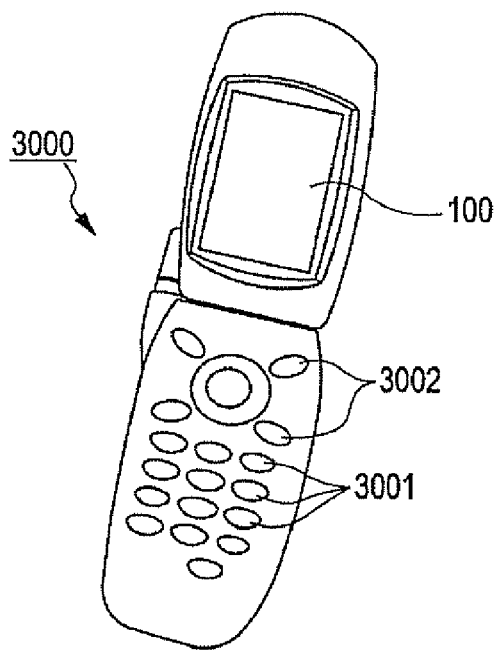
FIG. 14 is a perspective view showing a form of an electronic apparatus (cellular phone) according to an embodiment of the invention.
Figure 15:
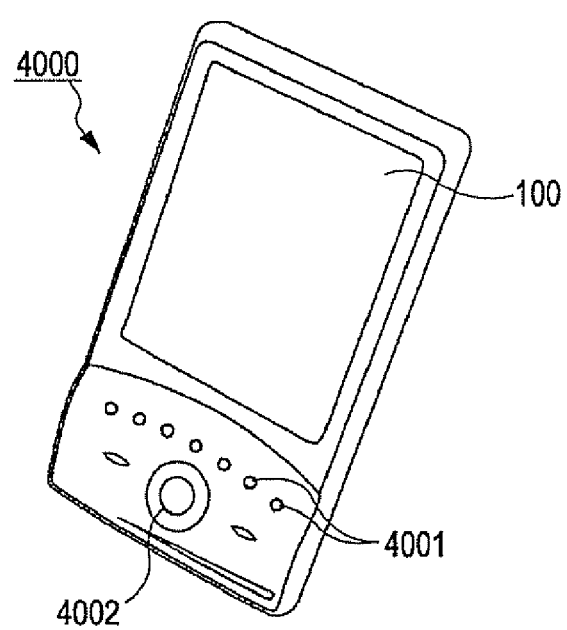
FIG. 15 is a perspective view showing a form of an electronic apparatus (mobile information terminal) according to an embodiment of the invention.

Next, an electronic apparatus using a display device according to an embodiment of the invention will be described. In FIGS. 13 to 15, forms of electronic apparatuses using the display device according to any one of the above-described embodiments are shown.

FIG. 13 is a perspective view showing the configuration of a mobile-type personal computer using the display device 100. The personal computer 2000 includes a display device 100 that displays various images and a main body unit 2010 to which a power switch 2001 and a keyboard 2002 are installed.

FIG. 14 is a perspective view showing the configuration of a cellular phone using the display device 100. The cellular phone 3000 includes a plurality of operation buttons 3001 and a plurality of scroll buttons 3002, and the display device 100 that displays various images. By operating the scroll buttons 3002, a screen displayed in the display device 100 is scrolled.

FIG. 15 is a perspective view showing the configuration of a personal digital assistants (PDA) using the display device 100. The personal digital assistant 4000 includes a plurality of operation buttons 4001, a power switch 4002, and the display device 100 that displays various images. By operating the power switch 4002, various information such as an address list or a schedule list is displayed in the display device 100.

As an electronic apparatus in which the display device according to an embodiment of the invention is used, there are a digital still camera, a television set, a video camera, a car navigation system, a pager, a computerized personal organizer, an electronic paper, a calculator, a word processor, a workstation, a video phone, a POS terminal, a printer, a scanner, a copy machine, a video player, a device having a touch panel, and the like, other than the apparatuses shown in FIGS. 13 to 15.

The entire disclosure of Japanese Patent Application Nos: 2007-108973, filed Apr. 18, 2007 and 2007-108974, filed Apr. 18, 2007 are expressly incorporated by reference herein.

What is claimed is:

1. A display device, comprising:
    a light source that emits a plurality of single-color light corresponding to a plurality of types of color components in a predetermined order;
    a liquid crystal shutter arranged on the light source provided with first regions and second regions in which transmissivity of a liquid crystal is individually controlled to selectively transmit light from the light source through the first regions and second regions, the first and second regions extending in a first direction and alternating along a second direction perpendicular to the first direction such that first regions are adjacent to second regions;
    an optical body having a plurality of lenticular lenses arranged on the liquid crystal shutter on an opposite side of the liquid crystal shutter from the light source, the lenticular lenses extending in the first direction parallel to the first and second regions, wherein each particular lens overlaps, in plan view, a particular first region and adjacent second region and refracts light when transmitted through the particular first region and adjacent second region in different respective directions for left and right eye viewing; and
    a liquid crystal device arranged on the optical body on an opposite side of the optical body from the liquid crystal shutter.

2. The display device according to claim 1, wherein the liquid crystal device further comprises:

a plurality of unit display regions that display first and second images having a parallax therebetween so as to be viewed stereoscopically; and a driving circuit configured to sequentially display single-color images respectively corresponding to the plurality of single-color light constituting each of the first and second images for one or more unit display regions among the plurality of unit display regions, and wherein the driving circuit sequentially displays the single-color images respectively corresponding to the plurality of single-color light for the first image within a first period, and sequentially displays the single-color images respectively corresponding to the plurality of single color light for the second image within a second period different from the first period.

3. The display device according to claim 2, wherein the liquid crystal shutter selectively emits the single-color light in a first direction and in a second direction different from the first direction for each of the unit display regions; and wherein the driving circuit further comprises:
(i) an illumination driving circuit that emits, in the first direction, the single-color light for each of the unit display regions in a period in which single-color images respectively corresponding to the plurality of single-color light of the first image are displayed, and emits, in the second direction, the single-color light for each of the unit display regions in a period in which single-color images respectively corresponding to the plurality of single-color light of the second image are displayed; and
(ii) a display driving circuit configured to control the transmissivity of each pixel of the liquid crystal device according to gray scales of the single-color images respectively corresponding to the plurality of single color light constituting each of the first and second images.

4. The display device according to claim 2, further comprising:
an image processing circuit configured to generate a separate image signal that designates gray scales of the single-color light including at least one of a white color component and a mixed component of two types of primary color components, from an input image signal that designates, for each pixel, gray scales of a plurality of primary color components for each of the first and second images; and
wherein the driving circuit sequentially displays single-color images respectively corresponding to the plurality of single-color light for the one or more unit display regions, based on the separate image signal.

5. An electronic device comprising the display device as set forth in claim 1.

6. The display device according to claim 1, wherein each lenticular lens has a central peak extending along the first direction, and the central peak is aligned with abutting edges of the particular first region and adjacent second region overlapped by the lenticular lens.

7. The display device according to claim 6, wherein valley regions of the optical body are defined between the central peaks of the lenticular lenses, and opposed side edges, opposite the abutting edges, of the first and second regions are aligned with the valley regions.

* * * * *